United States Patent
Vik

[19]

[11] Patent Number: 6,067,718
[45] Date of Patent: May 30, 2000

[54] GRASS TRIMMER FOR LAWN EDGES BORDERING GARDENS

[76] Inventor: Robert E. Vik, 2147 NW. 95th, Seattle, Wash. 98117

[21] Appl. No.: 09/290,303
[22] Filed: Apr. 12, 1999

Related U.S. Application Data

[63] Continuation-in-part of application No. 09/080,045, May 15, 1998, abandoned.
[51] Int. Cl.[7] .............................. A01G 3/06; A01D 34/84
[52] U.S. Cl. .................................. 30/276; 30/347; 172/13
[58] Field of Search ........................... 30/276, 347, 264; 15/12.5, 12.7; 172/13, 14, 16, 17

[56] References Cited

U.S. PATENT DOCUMENTS 2,149,463  3/1939  Orr ........................................ 30/264 X
5,423,126  6/1995  Byrne ....................................... 30/276

*Primary Examiner*—Douglas D. Watts
*Attorney, Agent, or Firm*—Robert W. Jenny

[57] ABSTRACT

The trimmer is adapted to trim the grass on the vertical or near vertical edges of a lawn bordering a garden. The trimmer incorporates conventional motor driven rotating blade or filament cutting element(s) at the lower end of an elongated handle assembly. There is a shroud around the cutting element(s). The handle assembly is configured such that the open side of the shroud faces the lawn and user when the trimmer is in use, allowing the user to stand and move on the lawn. The lower portion of the shroud contacts the surface of the garden and the edge of the shroud contacts the edge of the lawn to facilitate proper positioning of the trimmer in use. The handle assembly may be configured such that the handle itself is on the opposite side of the plane of the cutting element(s) from the lower end of the shank of the handle at its attachment to the shroud.

4 Claims, 1 Drawing Sheet

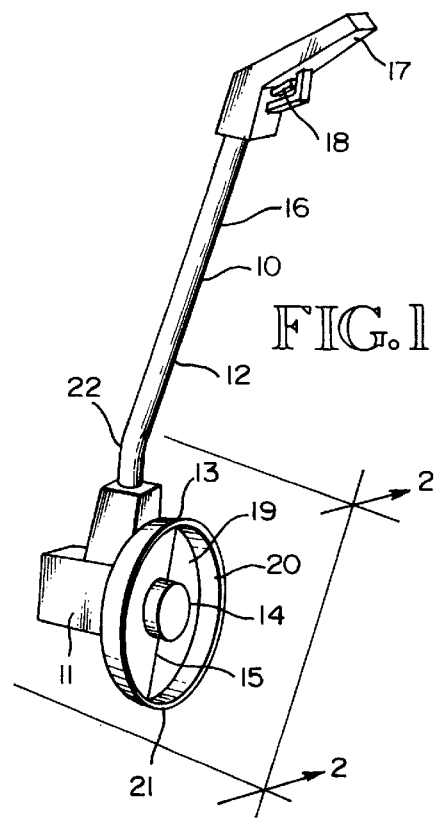
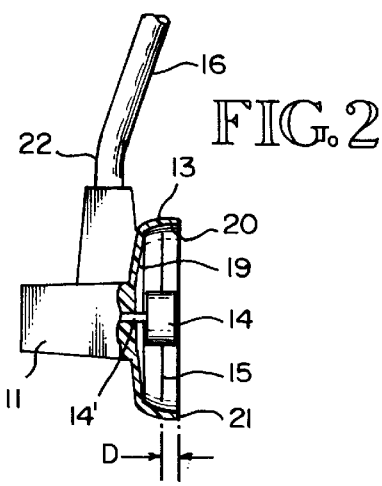
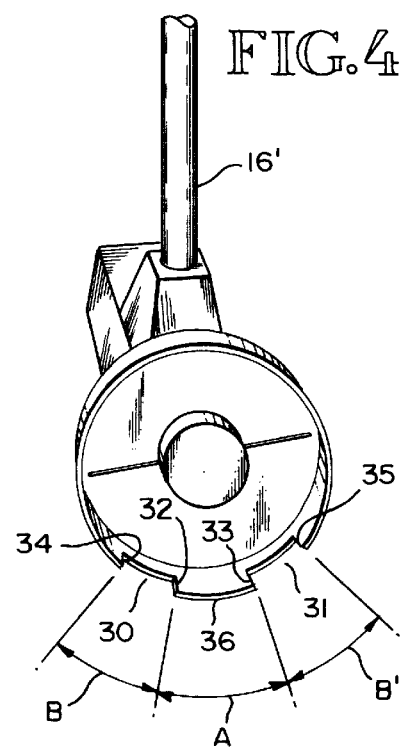
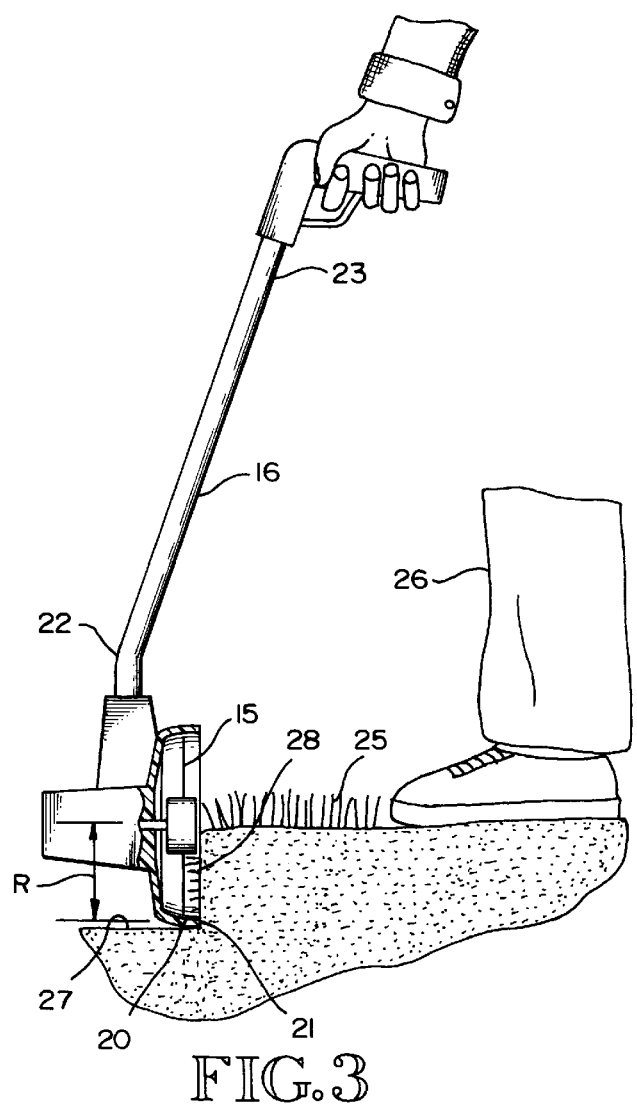

GRASS TRIMMER FOR LAWN EDGES BORDERING GARDENS

This application is a Continuation-in-Part application based on U.S. patent application Ser. No. 09/080,045, filed May 15, 1998, now abandoned.

BACKGROUND OF THE INVENTION

1. Field:

The subject invention is in the field of grass cutting equipment and apparatus. Specifically, it is in the field of such equipment which is termed trimmers and incorporates a rotating disk or one or more filaments rotating in a plane to cut the grass. More specifically, the invention relates to the features of such trimmers which help a user to trim grass at a desired and even height, particularly grass growing from surfaces which are steeply sloped or vertical.

2. Prior Art:

Various prior art grass trimmers are found in the U.S. Patents listed below:

| Re. 34,815 | |
|---|---|
| 2,708,335 | 2,791,082 |
| 2,708,819 | 3,031,830 |
| 2,718,742 | 3,221,481 |
| 2,718,743 | 3,656,555 |
| 2,759,319 | 5,226,486 |

The trimmers in these patents are of the type termed edgers and are intended for use along the edges of walks such that various tabs, guides and the like control the position of the cutting plane relative to the edge of the walk. These edgers are not useful in trimming grass which is growing from steeply sloped or vertical surfaces which form the edges of a garden bed, for example.

Grass trimmers intended primarily for use on grass growing on relatively level ground are also prior art to the subject invention. Achieving a desired and even height of cut with these trimmers is greatly facilitated by contact between the hub of the rotating cutter [blade or filament(s)] and the grass being trimmed. These trimmers can be used to trim grass growing from a steeply sloped or vertical surface by manipulating the trimmer so that the axis of rotation of the cutting element is essentially normal to the sloped or vertical surface. However, this manipulation is difficult and cumbersome and, for surfaces not higher than half the diameter of the cutting element, the benefit of contact between the cutting element hub and the grass being cut is not available since the hub cannot touch the grass being trimmed. Also, when trimming lawn edges which border gardens, care must be taken to bring the cutting element(s) close to the surface of the garden without allowing the cutting elements to strike the garden surface because such striking causes undue wear of the elements. Prior art edgers have no feature which facilitate cutting close to the garden surface. Further, when using prior art edgers to trim lawn edges bordering gardens the user must either stand in the garden or, if standing on the lawn, lean and/or reach rather awkwardly to hold the trimming elements appropriately relative to the edge being trimmed.

Accordingly, the primary objective of the subject invention is to provide a grass trimmer that is specially adapted to trimming edges of lawns bordering gardens, particularly when the height of the edges are less than half the diameter of the cutting element of the trimmer. Secondary objectives are that the trimmer facilitate cutting close to the lawn edge and garden surface and allow facile use of the trimmer by a user standing on the lawn.

SUMMARY OF THE INVENTION

The subject invention is a grass trimmer specially adapted to trimming grass on lawn edges bordering gardens. The trimmer comprises a motor, a shaft mounted cutting element driven by the motor, a shroud which extends completely around the cutting element, and an elongated handle assembly. The cutting element may comprise a hub and blades or a hub and at least one filament radiating from the hub operating in a plane.

The trimmer is adapted to serving the purpose described above by having (1) the cutting element(s) completely surrounded by the rim of the shroud, (2) the rim cylindrical or deeply conical, i.e. approximately cylindrical, (3) the free end(s) of the cutting element(s) close to the rim, and (4) the handle assembly configured such that the shank of the handle is perpendicular to the shaft on which the hub assembly is mounted and is therefore perpendicular to the axis of the cutting element(s) or the handle shank may be bent or shaped toward the plane of the cutting element(s) and the open side of the shroud which faces the user of the trimmer. Having the cutting element(s) completely surrounded by the rim of the shroud greatly facilitates proper positioning of the trimmer in use because the cutting element(s) are properly located when the rim is contacting the surface of the garden and the edge of the rim is contacting the upright edge surface being trimmed. The cylindrical or deeply conical shape of the rim allows ample space in the shroud for the grass being trimmed. Having the free end(s) of the cutting element(s) close to the rim assures that grass will be trimmed over the full depth of the edge of the lawn. Having the handle assembly configured as described provides for minimum interference between the trimmer and plants in the garden and allows the user to stand and walk on the lawn and use the trimmer without awkward reaching or bending.

The invention is described in more detail below with reference to the attached drawings.

BRIEF DESCRIPTION OF THE DRAWINGS

FIG. 1 is a general view of a preferred embodiment of the subject invention.

FIG. 2 is a semi-schematic partially sectioned view taken at 2—2 in FIG. 1.

FIG. 3 illustrates the trimmer of FIGS. 1 and 2 in place to trim grass growing from a lawn edge ordering a garden.

FIG. 4 illustrates an alternate embodiment of the shroud of the subject trimmer in which there are gaps in the rim of the shroud.

DETAILED DESCRIPTION OF THE INVENTION

The subject invention is a grass trimmer specially adapted to trimming grass growing on the edge of a lawn bordering a garden. FIG. 1 illustrates a preferred embodiment of the trimmer 10. Its primary components are a motor 11, a handle assembly 12, a shroud 13, a shaft mounted hub assembly 14 and at least one cutting element 15 extending radially from the hub of the hub assembly. The handle assembly comprises a shank 16 and handle 17 including switch lever 18. The shroud has a base 19, a rim 20 and a rim edge 21 lying in an edge plane perpendicular to the axis of rotation of the cutting element(s), i.e. parallel to the operational plane of the cutting element(s). The motor, shroud and hub assembly are attached to lower end 22 of the shank of the handle assembly. The rim completely surrounds the operational periphery of the cutting element(s).

FIG. 2 is a semi-schematic, partially sectioned view taken at 2—2 in FIG. 1 with parts numbered as in FIG. 1. The plane of edge 21 is a distance D farther from base 19 than the plane of rotation of cutting element 15 (filament) or any equivalent cutting element such as a blade. Distance D is the height of grass trimmed by the trimmer. The hub assembly is mounted on shaft 14'.

FIG. 3 illustrates the trimmer of FIGS. 1 and 2 in place to trim the grass growing from the edge of a lawn bordering a garden. Shank 16 may be straight and parallel to the plane of the cutting element(s) 15. However, in this embodiment of the trimmer shank 16 is configured so that its upper end 23 is on the opposite side of the plane of the cutting element(s) from its lower end 22. In this view the long axis of the handle is in a plane perpendicular to the plane of the cutting element(s). However, it may be at any angle relative to that plane between parallel and perpendicular and may be adjustable in that range to adapt to use by left or right handed users. With this handle assembly configuration open side 24 of the shroud faces the lawn 25 and user 26 to enable the user to stand and move on the lawn while using the trimmer. Rim 20 is contacting garden surface 27 and rim edge 21 is contacting upright edge 28 of lawn 25. The shroud base is essentially planar and the rim is cylindrical or the frustum of a deep truncated cone; i.e. the rim is at least approximately cylindrical. Preferably the cutting element(s) extend to within a small fraction of an inch from the rim.

FIG. 4 illustrates an alternate embodiment of the subject trimmer in which there are gaps in the rim of the shroud. Gaps 30 and 31 in rim 20' are symmetrical about a plane in which the longitudinal centerline of shank 16 and the axis of the cutting element(s) lie. Inner edges 32 and 33 of the gaps are at an angle A to each other in a range of 20° to 60° with 40° preferred. The angles B and B' between inner edge 32 and outer edge 34 of gap 30 and inner edge 33 and outer edge 35 of gap 31 are equal and in a range of 30° to 50° with 40° preferred. These gaps allow easier passage of uncut grass to the cutting element(s) while leaving rim portion 36 to help position the trimmer as shown in FIG. 3.

The embodiments described herein employ an electric motor to which the shroud is attached. In alternate embodiments a gasoline engine may be used, mounted at the upper end of the handle with the shroud and hub assembly attached to the lower end of the handle assembly.

It is considered to be understandable from this description that the subject invention meets its objectives. It provides a grass trimmer that is specially adapted to trim grass on lawn edges bordering gardens. The trimmer facilitates cutting close to the lawn edge and garden surface and allows facile use of the trimmer by a user standing on the lawn.

It is also considered to be understood that, while certain embodiments of the invention is described herein, other embodiments of the invention and modifications of those described are possible within the scope of the invention which is limited only by the attached claims.

I claim:

1. A trimmer for trimming grass growing from an edge of a lawn bordering a garden, said garden having a surface, said edge being upright, said trimmer comprising:

a shaft mounted hub assembly comprising (1) a shaft having a first axis and (2) at least one cutting element having an operational periphery and operating in a first plane, a shroud having a base, a rim, a rim edge on said rim and an open side, and a handle assembly comprising (1) a shank having a second axis, first end and a second end and (2) a handle, said first and second axes lying in a second plane, said shroud being attached to said hub assembly with said rim partially surrounding said operational periphery, said first end of said shank being attached to said shroud and said hub assembly such that said shank is parallel to said plane, said handle being attached to said second end of said shank, said shroud and said hub assembly being configured such that with said rim contacting said surface of said garden and said rim edge contacting said edge of said lawn, said cutting element is properly oriented for trimming said grass growing from said edge, said rim having a first gap and a second gap, said first and second gaps being symmetrical about said second plane such that there is a segment of said rim between them.

2. The trimmer of claim 1 in which said shank is configured such that said second end of said shank is on the opposite side of said plane from said first end of said shank.

3. The trimmer of claim 1 in which said base is planar and said rim is at least approximately cylindrical.

4. The trimmer of claim 2 in which said base is planar and said rim is at least approximately cylindrical.

* * * * *